May 20, 1952  G. A. MINDER  2,597,592
MOLD FOR SHAPING AND AMALGAMATING FOOD PRODUCTS
Filed Nov. 2, 1948
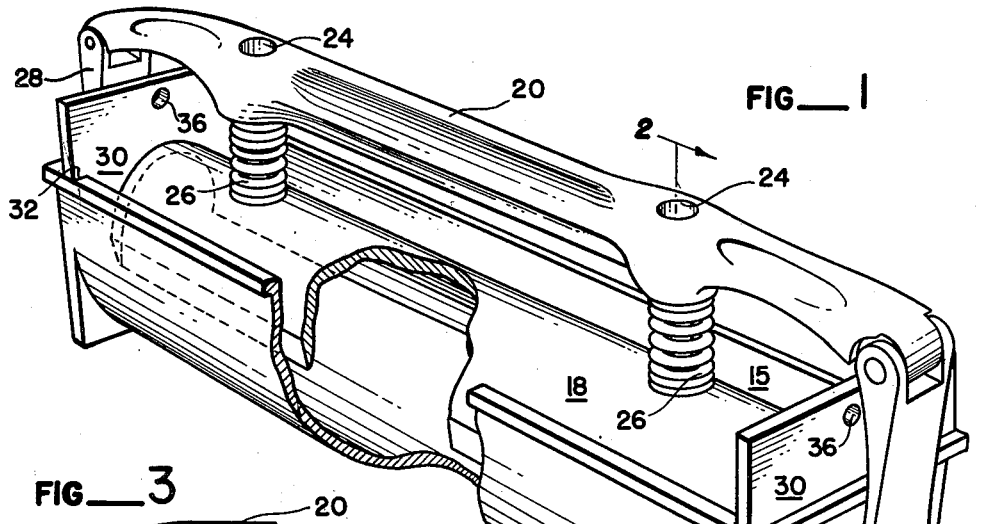
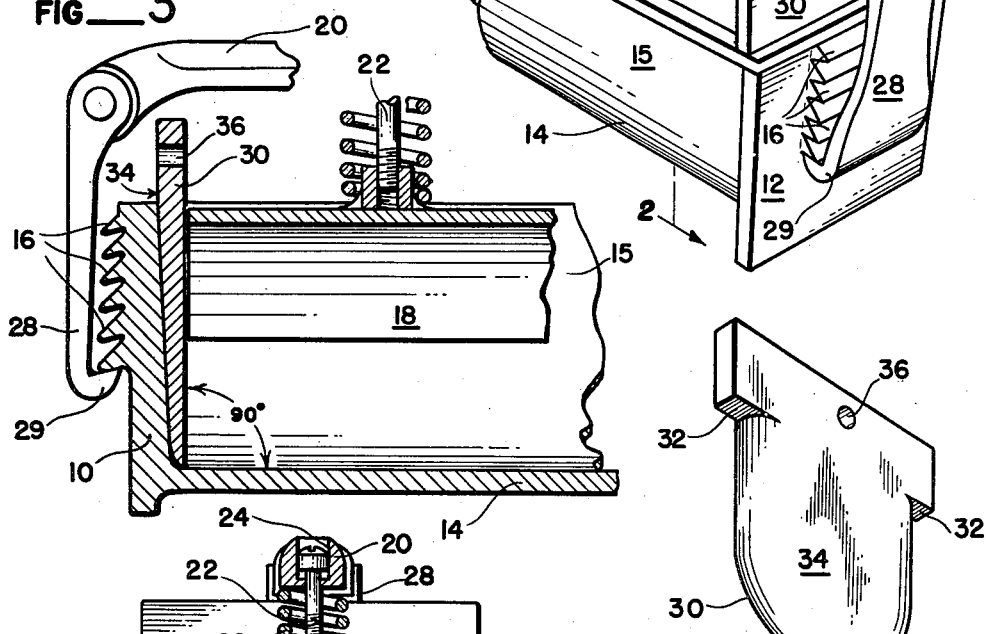
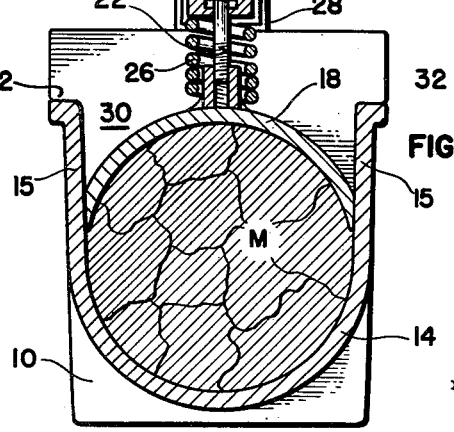
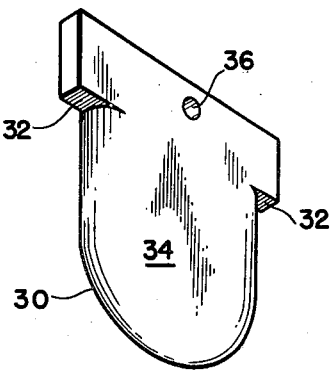
GEORGE A. MINDER
Inventor
Attorneys Patented May 20, 1952

2,597,592

UNITED STATES PATENT OFFICE 2,597,592

MOLD FOR SHAPING AND AMALGAMATING FOOD PRODUCTS

George A. Minder, Bremerton, Wash.

Application November 2, 1948, Serial No. 58,005

4 Claims. (Cl. 100—57)

My invention relates to improvements in a mold for shaping and amalgamating food products and, more particularly, comprises a separable mold for shaping pieces of meat and the like into a unitary mass for slicing.

While my invention has a variety of uses which will be readily recognizable by those skilled in the art of processing foodstuffs, I describe its application in the meat industry and its use in amalgamating and shaping pieces of meat for cold processing preliminary to slicing according to the methods disclosed in the Dubil Patent No. 2,052,221, issued August 25, 1936. In that invention, separate pieces of fresh meat, that have been trimmed from the bones, are placed in molds and shaped into a mass that usually has the form of a solid cylinder. The meat-packed molds are placed under refrigeration for a period sufficient to insure that the meat is frozen throughout to amalgamate it into a mass that can be handled during removal from the molds, during an intermediate thawing stage in the method, and while being placed in the slicing machine and sliced. More specifically, the separate pieces of meat are compressed together in a mold and subjected to a temperature of approximately 18° to 25° F. for a prolonged period up to 48 hours or to lower temperatures for shorter periods of time and then thawed slightly to approximately a degree or so above freezing and sliced. It is the removal of the meat from the mold with which my invention is most particularly concerned. It has been an aggravating and vexing problem in the past to remove the molded meat from the previous molds because of the low temperatures involved, and because the meat has close adhesion on its surface with the interior of the mold, brought about during molding by the substantial pressures applied to shape the pieces and compress them together. Ordinarily, the molds have been made of metal in order to withstand the hard usage to which they are subjected and to make them strong enough to carry the weight of the material that can be packed into them. When these prior molds are removed from the freezer they are immersed in hot water in order to loosen the bond between the meat and the metal but, nevertheless, the removal of the shaped meat from the mold cavity has always been difficult, partly because the heat absorbed by the mold is rapidly lost to the frozen meat in the mold and the slightest delay in getting the meat out of the mold is sufficient for a refreezing at the surface to occur. As a result, either repeated immersions are required or the mold must be beaten and jarred severely and often to dislodge the meat.

I have found that a primary source of difficulty encountered in the removal of the meat from the mold is that, because the mold is usually pan-shaped, with pressure applied from one side through a presser member, considerable suction results between the meat and the mold and that, unless air is admitted between the mold and meat mass almost immediately after the mold is warmed, the meat will re-freeze to the mold before it can be dislodged.

It is, therefore, a most important object of this invention to provide a separable mold that is so arranged that air can easily enter into the mold and between it and the meat.

Another difficulty that has been encountered with the prior art molds resides in the fact that the molds are generally formed with a slight taper or outward flare, both because they have been formed by casting operations and draft to the pattern has to be allowed in the foundry and, further, because a gradually increasing receptacle shape has been necessary to facilitate removal of the meat from the mold. This means that there has been a slight taper at the ends of the meat mold, causing the shaped mass of meat to have an angular end which is difficult to slice perpendicular to the axis until several partial slices have first been removed. In the "Chip-Steak" industry this is wasteful of both labor and material because these part slices are not normally saleable as steaks and the time to take even 3 or 4 such slices is time lost to the operation. Also, such a non-perpendicular end, in the slicing machine, on the following end, means a greater portion of the cylinder which can not be sliced. Such trimmings normally are used in ground meat products which are less valuable than the sliced meat.

It is, therefore, another and important object of this invention to provide a mold for processing meat pieces which will form a unitary mass that has ends that are perpendicular to the axis of the mass and will thus be capable of producing more whole slices, and which can be sliced on the following end more than has previously been possible.

Among the other objects and advantages of this invention are the provisions of: a meat mold that is simple to construct and use and is strong and durable under conditions of the most extreme usage; a mold that can easily be assembled and filled, and will apply substantial pressure upon meat therein and will accommodate the increase of internal pressures produced by expansion during freezing or which will continue to exert substantial pressures during contraction of the contents, as during a boiling operation; and a mold that can be quickly vented just prior to the removal of the contents to permit air to enter to the interior of the mold and between the mold and molded-meat mass.

Other objects and advantages of the invention will be more apparent during the course of the following description which is largely confined to the freezing preparation of meat but which, it will be understood, is equally applicable to use in sausage kitchens and the like for the cooking and shaping of meat into sausage loaves, or shapes adapted to fit particular cans as is the case with boned hams, Canadian-style bacon and the like.

In the accompanying drawing forming a part of this specification,

Figure 1 is a perspective view of my mold as it appears assembled with a portion broken away to show the interior arrangement;

Figure 2 is a view in vertical cross-section taken in the plane suggested by line 2—2 of Figure 1;

Figure 3 is a view in vertical section taken through an end of the mold in a plane at right angles to that of Figure 2; and Figure 4 is a perspective view of a mold end-plate that I employ in my device.

A preferable shape for the meat for use in the "Chip-Steak" industry is cylindriform, but it will be apparent that rectangular cross-sections can also be produced according to this invention. The "Chip-Steak" and round sausage mold, shown in Figure 1, comprises the receptacle formed of a pair of end walls 10 and 12, between which is the semi-cylindrical mold wall 14. Walls 10, 12 and 14 are preferably formed by a casting operation so that they are integral and that the lines of joinder are smoothly curved or filleted to eliminate too sharp corners and the like. Also, it should be noted that when such molds are produced by casting there will be a degree of draft which results in a slight flare to the inner surfaces of the mold walls which is best seen in Figures 2 and 3. I prefer to extend the side edges 15—15 of the bottom wall 14 to a point somewhat above the curved portion in order to insure sufficient capacity in the mold when it is being packed with meat pieces.

On the exterior faces of the ends 10 and 12, I form a series of teeth 16 which somewhat serve to reinforce the end of the mold and also are useful in attaching and adjusting the pressure applying device.

A semi-cylindrical concavo-convex presser member 18 of relatively thin-wall construction, and the mating half of the bottom wall 14, is adapted to fit into the cavity of the mold between its ends and side-walls and to overlie the separate pieces of meat M placed in the mold and to force them to the general cylindrical shape that is desired. The length of the presser member is less than the distance between the inner faces of the end walls for a reason that will be later described.

Pressure bar 20 overlies member 18 and extends from end to end of the mold as is shown in Figure 1. This pressure bar is strong and rigid and is joined to member 18 by bolts 22—22 attached to member 18 and which slide in sockets 24—24 of the bar 20. A spring 26 encircles each bolt 22 and tends to force apart presser member 18 and the bar 20. At each end, bar 20 has a latching dog 28 which is shaped on its end to provide hook 29 to engage under one of the teeth 16.

Filler plates 30—30, each having a lower curved end, are adapted to fit upright into the receptacle cavity. Each plate 30 is mounted juxtaposed to the inner face of one of the end walls 10 or 12 and between such walls and the adjacent end of the presser member 18. Plate 30 is of such a length that it extends from the bottom wall 14 to above the upper edges of the side walls of the receptacle, and I have found it desirable that ears 32 be provided so that the plate is partially supported by the upper edges of the side walls 15. Plate 30 is slightly tapered so that it fits closely to the inner taper of the end walls and so that its inner face 34 will be positioned perpendicular to the inner faces of the receptacle walls. A perforation 36 through plate 30 is useful in withdrawing the plate from a mold, as with the assistance of a skewer or the like, and also permits these plates to be hung on a rack as for sterilizing or storage.

When it is desired to mold a quantity of meat pieces, the lower receptacle, with the filler plates 30 in place but with the presser member 18 out of the way, is placed convenient to the operator and meat pieces are arranged therein to a predetermined amount. Usually the operator tries to lay the meat in place with the grain extending lengthwise of the mold and more or less evenly as to depth. When the mold has been filled, the presser member is brought into position and forced down until the latching dogs 28 and their hooks 29 are engaged on the desired teeth 16. The presser member 18 causes the meat to compact itself by displacing the air from within the chamber of the receptacle due to forcing the meat to close up the interstices. A mold thus solidly packed is placed in a freezer chamber for so long as is necessary to freeze the meat. Because of the moisture present it will be obvious that the meat freezes to the mold.

During freezing there is a tendency of the meat contained in the mold to swell and enlarge. Springs 26 and the slidable bolts 22 permit upward movement of the presser member 18 toward the bar 20 and relieve such expansion to a degree sufficient to avoid cracking of the mold at its ends or sides as is the case with the prior molds wherein there is no resiliency. When the filled mold is placed in a vat and boiled, as in certain food processes, the springs also cause member 18 to follow the meat as it reduces in volume through the loss of fatty components and the like.

After freezing, the meat-filled molds are removed from the freezer for the purpose of removing the molded-meat cylinders. This latter is accomplished as follows: The assembled mold is immersed in a bath of hot water which causes the mold to take on heat and produces a loosening of the bond between the meat and the mold. Actually, the surface of the molded meat is slightly melted or softened and, of course, will be slightly damp or wet. After immersion, the mold is disassembled by first disengaging the latching dogs 28 and their hooks from the teeth 16, whereupon the presser member may be lifted off the meat, then the operator withdraws the filler plates 30—30 from the receptacle to provide a slightly wedge-shaped cavity at each end of the meat through which air can enter to the bottom of the mold. All that normally need be done is turn the receptacle on its side and the molded meat will slide or roll out of the mold due to the fact that its surface, being damp, is somewhat slippery and because air can enter into the depths of the mold and get between the meat and mold to break any suction that would otherwise make this a difficult operation.

The removal of the meat from the molds is particularly facilitated by my invention, and a complete absence of the prior necessity of hammering the molds, prying on the meat, and other time-wasting and unnecessary operations is to be noted. Further, the re-use potential of my molds is many times that of the prior art.

It will be apparent to those skilled in the art that changes and alterations in my invention as to shape, size and material may be made to accommodate it to various related problems without departing from the scope and spirit of my invention.

Having thus described my invention, I claim:

1. A separable mold for shaping and amalgamating pieces of meat into a unitary mass, comprising: means forming a rigid metallic closed-end, upwardly open receptacle to receive and contain the meat material for shaping, the side and end walls of said receptacle flaring outwardly of said receptacle; a presser member to fit down into said receptacle between its ends and cover food material placed in the receptacle; a tapered plate removably positioned upright in said receptacle juxtaposed to an end of the receptacle and closely between said receptacle end and the adjacent end of the presser member; said plate extending above the presser member and the meat material in the receptacle sufficiently for easy removal when the mold is being dismantled, and means for retaining said presser member in adjusted position in said receptacle and against food material contained therein.

2. The structure according to claim 1 in which there is a tapered plate at each end of the assembled receptacle.

3. The structure according to claim 1 in which the face of the tapered plate that contacts the meat material is substantially perpendicular to the axis of the molded meat material in the receptacle.

4. A separable mold for shaping and amalgamating pieces of meat into a unitary, frozen mass; comprising: bottom, end and side wall means forming a rigid, metallic, upwardly open receptacle to receive and contain meat materials for shaping, said bottom being shaped to semi-cylindrical form and the inner face of said side and end walls rising thereabove in an outwardly flaring manner; a supplemental end plate juxtaposed against the inner face of each end of the receptacle and rising to above the mouth thereof, each said end plate being tapered between its faces so that in the juxtaposed position to an end face of the receptacle the inner face of the plate is perpendicular to the semi-cylindrical inner bottom of the receptacle; a presser member to fit down into said receptacle and having a semi-cylindrical lower face to oppose the semi-cylindrical bottom of the receptacle to therewith define a cylindrical molding zone, said presser member extending from side to side of the receptacle and between the opposed faces of said supplemental end plates; and means for retaining said presser member in adjusted position in said receptacle and against the meat material contained therein.

GEORGE A. MINDER.

REFERENCES CITED

The following references are of record in the file of this patent:

UNITED STATES PATENTS

| Number | Name | Date |
| --- | --- | --- |
| 1,182,588 | Ritthamer | May 9, 1916 |
| 1,184,857 | Kempton | May 30, 1916 |
| 1,404,588 | Dhe | Jan. 24, 1922 |
| 1,863,609 | Vanderkloot | June 21, 1932 |
| 1,988,558 | Kipper | Jan. 22, 1935 |
| 2,289,698 | Davis | July 14, 1942 |